INVENTOR.
ROBERT S. MUELLER
BY SIDNEY OLDBERG
Williams, David,
Hoffmann & Yount
ATTORNEYS

INVENTOR.
ROBERT S. MUELLER
BY SIDNEY OLDBERG
ATTORNEYS

INVENTOR.
ROBERT S. MUELLER
BY SIDNEY OLDBERG
Williams, David,
Hoffmann & Yount
ATTORNEYS July 11, 1967  R. S. MUELLER ET AL  3,330,373
SPEED GOVERNOR
Filed Aug. 11, 1964  4 Sheets-Sheet 4

INVENTORS
ROBERT S. MUELLER
BY SIDNEY OLDBERG
Williams, David
Hoffmann & Yount
ATTORNEYS

United States Patent Office 3,330,373
Patented July 11, 1967

3,330,373
SPEED GOVERNOR
Robert S. Mueller, Oak Park, and Sidney Oldberg, Birmingham, Mich., assignors to Eaton Yale & Towne Inc., a corporation of Ohio
Filed Aug. 11, 1964, Ser. No. 388,790
28 Claims. (Cl. 180—105)

The present invention relates to a speed control device and particularly to a speed governor for use in a vehicle to assist the vehicle driver to maintain a desired vehicle speed.

The principal object of the present invention is the provision of a new and improved speed governor which is reliable in operation, durable, and constructed so as to operate to automatically maintain the vehicle at a preselected speed or to provide an indication to the driver that a predetermined vehicle speed has been reached.

A further object of the present invention is the provision of a new and improved speed governor operable to provide resistance to pressing of the accelerator pedal by the vehicle driver when the vehicle reaches a predetermined speed, and including a torsion spring means which acts against depression of the accelerator pedal when the vehicle speed exceeds a predetermined speed.

A still further object of the present invention is the provision of a new and improved speed governor for a vehicle wherein a resistance is provided to the pressing of the accelerator pedal of the vehicle when the predetermined speed is exceeded by a torsion spring means and wherein the torsion spring acts to decrease the speed of the vehicle when the speed of the vehicle is greater than the predetermined speed.

Another object of the present invention is the provision of a new and improved speed governor wherein a torsion spring acts between a rotatable throttle control member which is rotated in response to movement of the accelerator pedal of the vehicle and a member movable in opposite directions in response to the vehicle being above or below the desired or preset speed.

Still another object of the present invention is the provision of a new and improved speed governor as noted in the next preceding paragraph for automatically maintaining the speed of a vehicle and is operatively connected to a drive mechanism for movement thereby in opposite directions in response to the speed of the vehicle.

An additional object of the present invention is the provision of a new and improved speed governor which is capable of providing a resistance to the pressing of the accelerator pedal of the vehicle at a predetermined speed and wherein the speed governor includes a lever which is moved in a first direction by a spring when the throttle shaft is rotated to increase the speed of the vehicle and where the lever engages a movable control or stop member at the predetermined speed and the control member moves against the lever to cause the spring to be compressed and apply a "back pressure" resisting further movement of the throttle shaft when the preset speed is exceeded.

Yet another object of the present invention is the provision of a new and improved speed governor utilizing an electromagnetic means which when energized controls the position of a throttle control member through linear movement of a part associated with the electromagnetic means and wherein the part is moved linearly in response to variances in vehicle speed by a portion of a weight means which is mechanically interconnected with the part.

A further object of the present invention is the provision of a new and improved speed governor having a speed sensing mechanism comprising a rotatable weight carriage and wherein the rotation of the weight carriage is transmitted by motion transmitting drive means and linkage means to a throttle control member when the speed of the vehicle is below or above a predetermined or preset speed.

A still further object of the present invention is the provision of a new nad improved speed governor having a drive for controlling the operation of a throttle control member and wherein the drive includes drive and driven members having a neutral position wherein the drive is inoperative and actuating positions in which the drive is operative.

Also an object of the present invention is the provision of a new and improved speed governor, as noted in the next preceding paragraph, having a feedback mechanism operable to maintain the drive and driven members in their neutral positions and tending to return them to the neutral position upon movement therefrom.

Another object of the present invention is the provision of a new and improved speed governor as noted in the next preceding paragraph wherein the driven member is a wheel which is pivotal relative to the drive member which is a pin member and the pin member is biased against the wheel by weights which apply a force to the pin member in proportion to the vehicle speed, and a governor spring resists pivotal movement of the wheel by the weights which occurs when the forces applied to the wheel by the governor spring, on one hand, and by the pin member, on the other hand, are unequal.

Yet another object of the present invention is the provision of a new and improved speed governor having a governor spring settable to the desired speed for the vehicle by a suitable mechanism which includes overcenter spring means which act against the governor spring when set or compressed.

A further object of the present invention is the provision of a new and improved speed governor having a speed sensing means comprising a carrier carrying a plurality of weights which move outwardly with a force dependent upon the force of rotation of the carrier and wherein the weights engage an elliptical-shaped spring member which, in turn, engages a pin member in a manner to effect movement of the pin member upon movement of the weights, as well as to effect transmission of torque to the pin member from the weight carrier.

Further objects and advantages of the present invention will be apparent to those skilled in the art to which it relates from the following detailed description thereof made with reference to the accompanying drawings forming a part of this specification and in which:

The present invention provides a speed control device and specifically a speed governor for use in a vehicle for assisting the operator of the vehicle to control the speed of the vehicle and not exceed a preselected or predetermined speed. The speed governor of the present invention is operable to provide an automatic control for maintaining the speed of the vehicle at a predetermined speed without driver control so that if the speed of the vehicle is less than the predetermined speed, the governor automatically operates to increase the speed of the vehicle to the predetermined speed and if for some reason the speed of the vehicle increases above the predetermined speed, the speed governor is operable to automatically decrease the speed of the vehicle. Moreover, the speed governor, while not being operated to automatically maintain a predetermined speed for the vehicle, is operable to provide an indication to the driver when the vehicle reaches a predetermined speed. This indication is in the form of a back pressure or resistance to the depressing of the acceleration pedal of the vehicle.

A speed governor A is shown in the drawings as forming the preferred embodiment of the present invention. The speed governor A is operatively connected with a throttle control shaft member 14 which is rotatable in opposite directions so as to effect an increase or decrease in the vehicle speed, as is well known. The throttle control shaft 14 is connected to the accelerator pedal of the vehicle and to the throttle control valve so as to be rotated in opposite directions upon movement of the accelerator pedal in opposite directions to control the throttle valve. These connections are conventional and may vary from vehicle to vehicle and will not be described in detail.

The speed governor A is associated with the throttle control shaft 14 so as to effect rotation thereof to automatically increase and decrease vehicle speed when the speed of the vehicle varies from a preset or predetermined speed and includes a motion transmitting drive mechanism 12 for rotating the throttle shaft 14. The mechanism 12 includes an actuating or control member 145 movable upon rotation of a driving or wheel member 140. The wheel member 140 is supported in a movable frame 33 and is driven by a drive or pin member 90 when the wheel 140 is moved from a neutral or centered position relative thereto to an off-center relation with the pin 90, as will be described in great detail hereinbelow.

The speed governor A also includes a preset mechanism 10 which is settable to the speed desired within a range, and also includes a speed sensing mechanism 11 which is driven in timed relation to the speed of the vehicle. The preset mechanism 10 and sensing mechanism 11 are operatively associated with the drive means 12 so that when the speed of the vehicle varies from the preset or predetermined speed, the drive means 12 operates to actuate the throttle control shaft 14.

Figure 7:
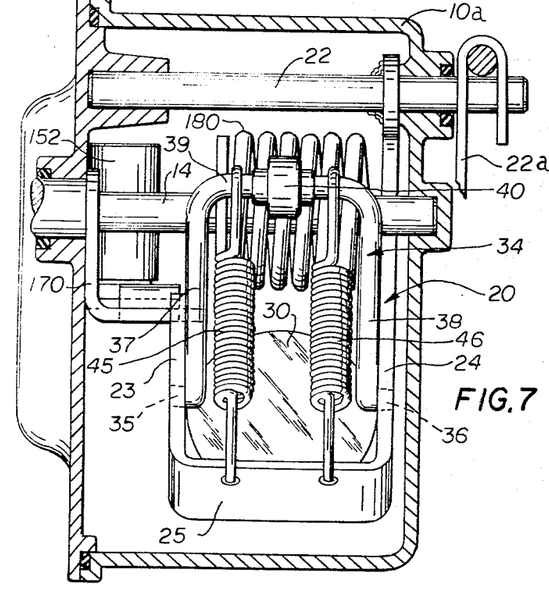
FIG. 7 is a cross-sectional view of the speed governor mechanism shown in FIG. 1, taken approximately along the section line 7—7 of FIG. 1.

The mechanism 10 which is set to the predetermined speed includes a lever member 20 and a governor spring 21 associated with the lever member 20. The upper end of the lever member 20, as viewed in FIG. 7, is fixedly connected to a shaft member 22 which is rotatably supported in the housing 10a of the governor mechanism. The shaft member 22 is rotated in response to the operation of the dashboard control in the vehicle and a control lever 22a mounted on the shaft 22 outside the housing 10a is connected to the dashboard control in a conventional manner, as is well known. The lower end of the lever member 20, namely, the end remote from the shaft 22, has a U-shaped configuration with the legs 23, 24 of the U-shaped configuration connected by a base portion 25.

Figure 2:
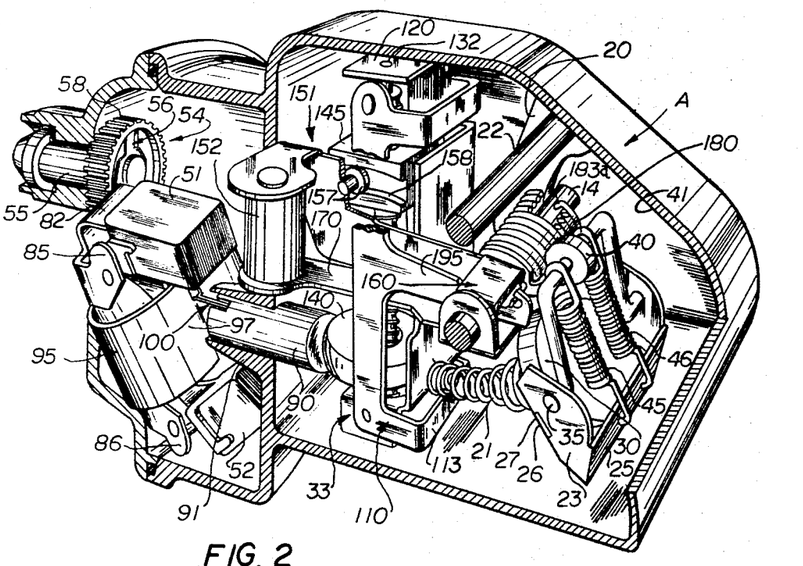
FIG. 2 is a perspective view of the speed governor mechanism shown in FIG. 1.
Figure 3:
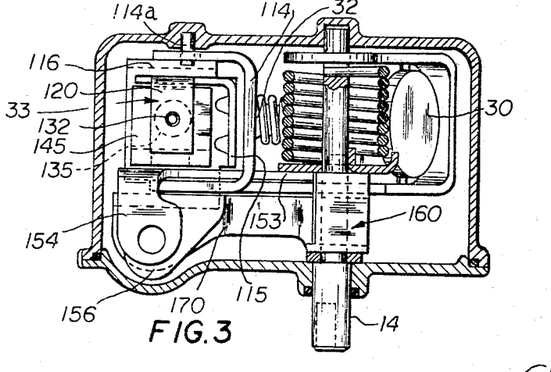
FIG. 3 is a cross-sectional view of the speed governor mechanism shown in FIG. 1, taken approximately along the section line 3—3 of FIG. 1.

The inner side of the legs 23, 24 are provided with slots or recesses 26 therein, see FIG. 2, and opposite projections 27 on a spring retainer cap 30 extend into the projections so as to hold the spring retainer cap 30 in position relative to the lever member 20. The spring retainer cap 30 has a recess 31 therein and the spring governor 21 has an end portion which is conical in shape and the outermost helix of the spring 21 is positioned in the spring retainer recess 31 and is maintained therein. The major portion of the governor spring 21 is of a helical configuration and the end of the governor spring 21 remote from the spring retainer cap 30 encircles a projection or tip on the frame 33 forming a part of the drive mechanism 12.

The leg portions 23, 24 of the lever member 20 have a pair of aligned openings therein in which projecting portions 35 and 36 of a U-shaped member 34 extend. The portions 35, 36 are located on the outermost ends of the legs 37, 38, respectively, of the U-shaped member, which legs are connected by a base portion 39. The base portion 39 of the U-shaped member 34 carries substantially centrally located thereon a roller member 40.

Figure 1:
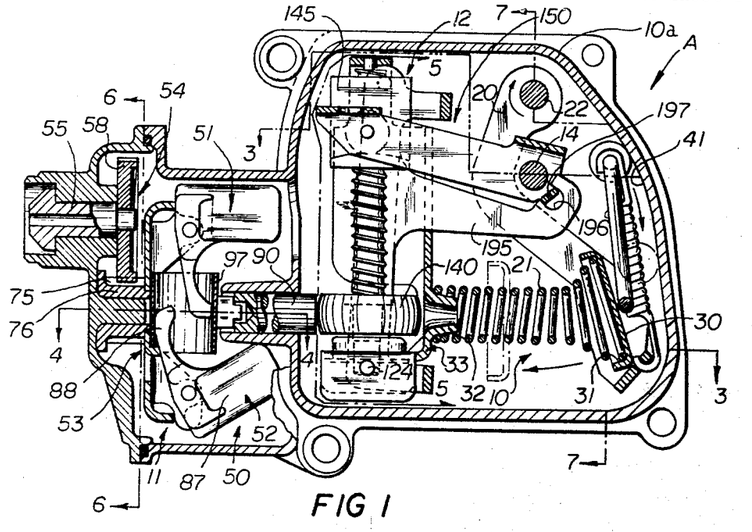
FIG. 1 is a sectional view with parts omitted of a speed governor mechanism embodying the persent invention.

The roller member 40 when the lever member 20 is in its full line position shown in FIG. 1 is biased into a position in engagement with an inner surface portion 41 of the housing 10a of the speed governer. The means for biasing the roller member 40 into engagement with the surface portion 41 of the housing 10a comprises a pair of spring members 45, 46. Each of the spring members 45, 46 has opposite hook-like ends, one end each of which engages a portion of the base 39 of the U-shaped member 34 and the other end of which is positioned in an opening in the base portion 25 of the lever 20.

The spring members 45, 46 bias the roller member 40 into engagement with the inner portion 41 of the housing of the speed governor, as noted above, and this tends to move the lever 20 against the governor spring. It should be noted, however, that upon rotation of the shaft 22, the lever member 20 is rotated to the left in FIG. 1 and the governor spring 21 is compressed and applies a force against the frame 33 of the control mechanism 12, the purpose of which will be described hereinbelow. When the lever 20 is so moved to compress the governor spring 21, the roller member 40 rolls down the surface portion 41 of the housing to the position shown in dot-dash lines in FIG. 1. When the governor spring is so compressed and the lever member 20 has been so moved, the springs 45 and 46 move near over-center and act against the governor spring 21 tending to compress the governor spring. The movement of the roller along the surface 41 is such that the springs 45 and 46 maintain just enough tension to balance the load of the governor spring. Thus, the springs 45, 46 operate against the governor spring at all times in both directions so that the force required to move the control shaft 22 is a small friction force and is equal in both directions.

As noted hereinabove, the sensing mechanism 11 is operatively associated with the preset or governor spring mechanism 10 to provide a control operation and effect operation of the drive means 12 when the sensing mechanism senses that the speed of the vehicle is either below or above the preset speed. The sensing mechanism comprises a sensing unit 50 which includes a pair of weights 51, 52 and a carriage or carrier 53 on which the weights, 51, 52 are pivotally carried so that upon rotation of the carrier 53, the weights are moved relative to the carriage by centrifugal force to provide the desired control function.

A suitable one-way drive means 54 is provided for driving the carriage 53 at a speed in proportion to the speed of the vehicle. The drive for the weight carriage 53 includes an input shaft member 55 which is rotated at a speed in proportion to the speed of operation of the vehicle from the transmission of the vehicle. The input shaft 55 fixedly carries a flexible finger member 56 on its end extending into the housing of the speed governor. The finger 56 is positioned in a recess 57 on a gear 58 rotatably carried on the shaft member 55. A pair of diametrically opposed cams 59, 60 are positioned in the recess 57 of the gear 58. The cams 59, 60 are shown in FIG. 6 and are as triangular-shaped members having axially extending faces 61, 62, respectively which extend substantially perpendicular to the base of the recess 57 and inclined upper surfaces 61a, 62a, respectively, which extend from the base of the recess to the outer end of the vertical faces 61, 62, respectively.

Figure 6:
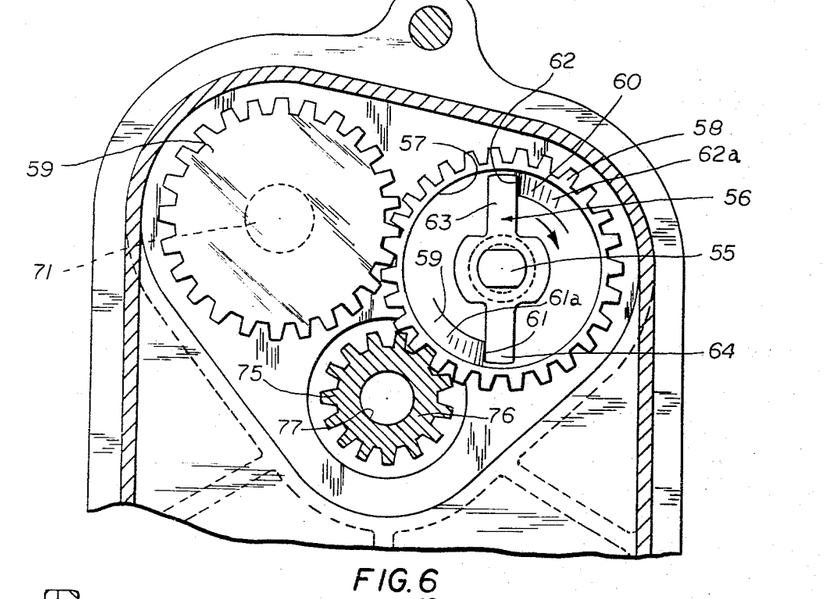
FIG. 6 is a sectional view of the speed governor mechanism shown in FIG. 1, taken approximately along the section line 6—6 of FIG. 1.

The finger member 56 has radially projecting portions 63, 64 which extend outwardly or radially from the shaft member and which are adapted to engage the vertical faces 61, 62, respectively, of the cam members when the vehicle is being driven in a forward direction which provides for rotation of the the input member 55 in the direction of rotation, as shown in FIG. 6. It can be seen that upon rotation of the shaft member 55 in the direction shown in FIG. 6, the projecting portions 63, 64 of the finger member 56 will engage the vertical faces 61, 62 of the cams 59 and 60 and cause rotation of the gear 58 with the shaft member 55. Upon rotation of the shaft member 55 in the opposite direction, the projections 63, 64 are rotated and engage the surface portions 61a, 62a, of the cam members 59, 60 and are merely raised or bent to a position where they do not effect rotation of the gear member 58, but rather rotate relative to the gear member 58.

As noted above upon rotation of the shaft member 55 in a direction which corresponds with the direction of forward movement of the vehicle, the gear 58 is driven by the finger member 56. The gear 58 meshes with a gear 59 rotatably carried by the housing of the speed governor. The gear 59 has a hub portion which extends through an opening in the housing and which is adapted to be connected to a speedometer cable 71 and effect driving of the speedometer to indicate the speed of the vehicle. The gear 58 also meshes with a driving or hub or gear teeth 75 provided on a projecting portion 76 of the weight carriage 53, in order to drive or rotate the weight carriage 53. Accordingly, the weight carriage 53 is rotated only when the vehicle is being driven in a forward direction.

The portion 76 of the weight carriage 53 has a central opening therethrough, 77, and a projecting portion or pin portion 78, of the housing 10a of the speed governor is positioned in the opening 77 and rotatably supports the portion 76 of the weight carriage 53 for rotation within the housing 10a.

The weight carriage 53 also includes a pair of oppositely projecting portions 80, 81 which extend radially from the hub portion 76 of the carriage. The projecting portions 80, 81 have their outer ends bent inwardly toward the governor spring 21 providing flange portions 82, 83, respectively. Adjacent the flanges 82, 83, the projecting portions 80, 81 each carry a pair of axially extending members 85, 86, respectively.

The weight means 51, 52 which are carried by the weight carrier 53 are pivotally supported intermediate the portions 85, 86, respectively, of the weight carrier. Each of the weight means 51, 52 includes an enlarged weight portion 87 and an actuating portion 88 which extends at approximately a 90-degree angle with respect to the weight portion 87. The weights are pivotally supported between the projections 85, 86 by a shaft member which extends through the weights and through the projections.

The weight members take the position of the weight 51 shown in the lower portion of FIG. 1 when not rotating, whereas when the weights rotate, the weight portions 87 move outwardly by centrifugal force and the actuating portions 88 of the weight means 51, 52 are moved axially in a forward direction toward the governor spring 21. The outermost position of the weights is provided by the flange portions 83, 82, respectively, which engage the weights, 52, 51, respectively, when in their outermost position, so as to prevent movement of the weight means outwardly after engagement therewith.

Operatively associated with the weight carriage 53 is a means for transmitting torque from the weight carriage 53 and comprising the pin or shaft member 90 which is rotatably carried by the housing of the governor. The shaft of pin member 90 is slidably and rotatably supported in a hub portion 91 of the housing 10a. The hub portion 91 is located in aligned spaced relation to the projecting portion 78 of the housing which portion supports the weight carriage 53 for rotation. The means for transmitting torque from the weight carriage 53 to the shaft or pin member 90 also functions to apply a biasing axial force to the shaft member 90 and comprises a spring means 95. The spring means 95 comprises an elliptical-shaped spring member which is formed from sheet spring steel.

The elliptical-shaped spring member 95 has arcuate axially spaced portions 96, 97. The portion 96 is secured in a suitable manner to the base of the weight carrier 53 and the portion 97 of the spring means 95 is positioned adjacent to the shaft member 90 and connected thereto in a manner to be described in detail hereinbelow. The spring means 95 is open at its opposite ends or radial portions and the actuating portions 88 of the weight means 51, 52 extend into the center or interior of the spring 95 into position intermediate the portions 96, 97 of the spring 95. The actuating portions 88 of the weights when moved by centrifugal force are moved forwardly so as to engage the forward portion of the spring, namely, the portion 97 of the spring means 95 and apply a biasing force thereto as the speed of rotation increases for a purpose which will be described hereinbelow.

A suitable centering means and drive connection is carried by the portion 97 of the spring means 95 and cooperates with the adjacent portion of the shaft or pin member 90 to effect the transmission of the torque to the pin member 90. The centering means comprises a projecting portion 100 which includes shoulder portions 101 and a projecting tab portion 102 which extends axially beyond the shoulder portions 101. The shoulder portions 101 of the centering projecting tab portion 100 engage axial surfaces of the pin member 90 and the portion 102 thereof extends into a slot formed in the end of the pin member 90, which slot is constructed to receive the projecting portion 102 and provide a slidable connection therebetween with a minimum of clearance so that upon rotation of the centering means or projecting portion 100, the pin or shaft member 90 is rotated. From the above description, it should be readily apparent that as the weight carriage 53 is rotated by the gear 58, the pin member 90 is rotated through the tab connection 100. The pin member 90 is also biased outwardly toward the governor spring by the engagement of the shoulder members 101 with the opposite axial end of the shaft member 90 and by the inherent flexibility of the portion 97 of the elliptical-shaped spring member.

The outermost end of the shaft member 90 is operatively associated with the motion transmitting drive means 12, as noted above. The motion transmitting drive means, as noted above, is associated with the preset mechanism and the speed sensing mechanism and controls the operation of the throttle control member 14. The drive means 12 comprises a pivot frame structure 110, see FIG. 5, which includes a pair of spaced elongated vertically extending members 111, 112. The members 111, 112 are interconnected at their opposite ends by U-shaped projecting portions 113 and 114, respectively. The upper end of the frame member 110, as viewed in FIG. 1, is pivotally supported by the housing 10a. Specifically, the upper end of the frame member 110 is provided with openings therein in which pivot pins 114a are positioned and which pivot pins are supported in the housing 10a in order to provide for pivotal movement of the frame member 110 about the axis of the pivot pins.

The pivot frame 110 carries the bearing support frame 33 which is pivotally connected to the pivot frame 110 at the lower end thereof. The bearing support frame 33, as noted above, has a forward projecting tip portion 32 which is encircled by the governor spring 21. The projecting portion 32 extends toward the governor spring 21 from a forward face or flange portion 115 of the bearing support frame. The portion 115 at one side has a plate portion 116 which extends therefrom at a 90° angle. The portion 116 of the frame 33 has a vertically extending portion 118 which extends upwardly and a laterally extending portion 120 which extends outwardly from the vertically extending portion 118.

Figures 4, 5:
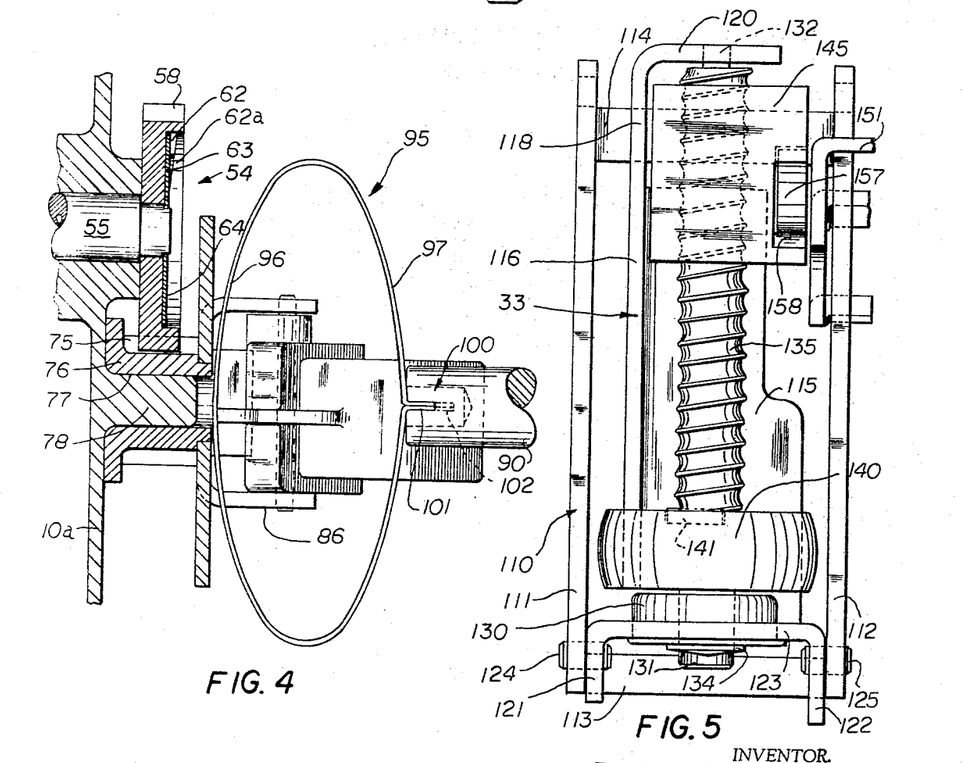
FIG. 4 is a cross-sectional view of the speed governor mechanism shown in FIG. 1, taken approximately along section line 4—4 of FIG. 1.
FIG. 5 is a cross-sectional view of the speed governor mechanism shown in FIG. 1, taken approximately along the section line 5—5 of FIG. 1.

The lower end portion of the frame 33 has a U-shaped configuration with the legs 121, 122 of the U extending vertically, as shown in FIG. 5. The legs 121, 122 are interconnected by a base portion 123 which is secured to and connected with the projecting portion 32 which is adjacent thereto. The leg portions 121, 122 have openings therein which are aligned with openings in the pivot frame 110 and in which openings pivot pins 124, 125 are secured in order to provide for supporting the frame members 33, 110 for relative movement.

The base portion 123 of the bearing support frame 33 supports a bearing structure, designated 130. The bearing 130 cooperates with a shaft or rotatable member 131 which extends therethrough and which extends vertically of the frame member and the upper end of the shaft member or rotatable member 131 has a projecting stub shaft portion 132 which is rotatably received in an opening formed in the upper portion 120 of the bearing support frame. The shaft member 131 is secured against axial movement relative to the base portion 123 of the frame 33 by a suitable retaining arrangement, designated 134.

The shaft member 131 for the major portion of its length has a screw thread 135 formed thereon. The shaft member 131 also carries the wheel member 140 which is drivingly connected to the shaft 131 by press fit. The screw threads 135 on the shaft member 131 cooperate with the actuating or control member 145 which is positioned on the shaft member and which is movable in opposite directions along screw threads 135 in response to rotation of the shaft member 131. The control member 145 is commonly known as a "ball nut" member which has an axial opening therethrough in which are positioned ball members which cooperate with the screw threads 135 to drive the nut member 145 along the screw threads. A pin member 141 is secured in an opening in the shaft 131 and is positioned in a recess of the wheel member 140, and a similar pin member is located at the upper end of the shaft member. These pin members limit travel of the "ball nut" member and permit freewheeling of the ball nut at the extremes of its travel. Such a ball nut mechanism is shown in United States Letters Patent No. 2,446,393, issued Aug. 3, 1948.

The drive for rotating the rod 131 and, particularly, the wheel 140, is provided by the pin member 90, as above noted, which has its adjacent end portion bearing against the outer periphery of the wheel 140. The outer periphery of the wheel 140 has a slightly convex configuration, while the adjacent end of the pin member 90 has a recess 90a therein which cooperates with the convex portion of the wheel member 140. The end portion of the pin member 90 having the recess therein engages the outer periphery of the wheel 140, and when the wheel 140 is located centrally with respect to the outer end of the pin member 90 in a neutral position relative thereto wherein the axis of the pin is normal to the axis of the wheel 140, the wheel 140 is not driven by the pin member since the forces on the wheel tending to rotate the wheel are balanced and the wheel is maintained stationary.

If, on the other hand, the forces applied to the wheel by the shaft member 90 are unequal, the wheel, of course, rotates. The unequal application of forces to the wheel member 140 occurs when the wheel member slips or is moved off-center or from its neutral position with respect to the pin member 90. The pin 90 and wheel 140 are associated so that a driving relationship is obtained upon a small pivotal movement of the wheel 140. The recess in the center of the end of the pin 90 contacting the wheel so provides. It should be apparent, however, that the periphery of the wheel 140 could be constructed to so provide. The wheel member 140 moves from the neutral position with respect to the pin member 90 when the bearing support frame which carries the wheel member 140 pivots with respect to the pivot frame 110. For example, if the wheel member 140 and frame 33 pivot to the right, as shown in FIG. 1, the wheel member is moved to an actuated position, as shown in dot-dash lines in FIG. 9 and the wheel cooperates with the end of the shaft member 90 and is driven in a direction wherein the control or nut member 145 moves linearly inwardly or down, as viewed in the drawings, on the screw threads 135. When the wheel member 140 is tilted in a reverse direction, that is to the left, as viewed in FIG. 1, to another actuated position from the neutral position, the wheel member will be rotated by the shaft member 90 in a reverse direction, namely, in a direction wherein the control or nut member 145 moves linearly outwardly on the shaft member or screw threads 135.

As noted above, the linear movement of the control member 145 controls the operation of the throttle shaft 14 in order to provide the desired control at the preset speed. The movement of the nut or control member 145 is effected on pivoting movement of the wheel member 140. This pivoting movement occurs when there is an unbalance of forces on the frame 33. The forces on the frame member 33, as noted hereinabove, are the forces applied by the governor spring 21 which tend to pivot the wheel member toward the left, as viewed in FIG. 1, in which position, the wheel member causes the nut member to be driven outwardly on the screw threads 135 to the position shown in the drawings. The pin member 90, on the other hand, biases the wheel member through the action of the spring means 95 toward the right against the action of the governor spring 21 and if the force applied to the wheel 140 by the pin member 90 exceeds the force applied by the governor spring, the wheel member 140 is rotated to the right, as viewed in FIG. 1, causing the nut member 145 to be moved down along the screw threads 135, as described hereinabove.

The governor spring 21 holds the frame 33 and the wheel member in a position pivoted to the left, as shown in FIG. 1, when the speed of movement of the vehicle is less than the preset speed as noted above. As the speed of movement of the vehicle increases, the force applied to the wheel by the shaft member 90 is increased because of the centrifugal force or action of the weight members 51, 52 which move axially outwardly against the inner surface of the portion 97 of the spring means 95 to apply an increasing force to the spring 95, and which, in turn, applies a force to the pin member 90. When this force applied by the spring member 95 to the shaft 90 equals the governor spring force, no drive is effected to the shaft member 130 and the control member is maintained in a stationary position. If this force exceeds the force of the governor spring, the nut member is moved downwardly along the screw threads and provides a control function as will be described hereinbelow.

The control member 145 is connected to the throttle control member 14 by a linkage mechanism 150 which transmits the motion of the control member 145 to the throttle control shaft 14, as will be described in detail hereinbelow, to provide the desired function. The linkage mechanism 150 comprises a first lever member 151 functioning as a solenoid support lever which supports an electromagnetic means or solenoid 152 having an electrical coil for movement along the screw threads 135 with the control member 145 and, yet, permits the control member 145 to pivot relative thereto. The lever member 151 has an elongated portion 153 and a flange portion 154 at the end of the elongated portion adjacent the nut member or control member 145. The flange portion 154 extends away from the nut member 145 and has a plate or solenoid support 156 secured thereto. The solenoid 152 is secured to the plate 156.

The elongated portion 153 of the lever member 151 supports a roller 157. The roller 157 is positioned in an arcuate groove 158 in the control member 145, defined as an arc having its center at the pivot point of the frame members 33 and 110. Thus, the control member 145 and the rod 131 may pivot about the pivot point of the frame member and relative to the roller 157 and the solenoid 152.

The end of the elongated portion 153 of the lever 151 remote from the end adjacent the nut or control member 145 forms a bifurcated support portion, designated 160, and which has openings therein which is rotatably received on the throttle support shaft 14 and which is freely rotatable thereon. Upon movement of the nut member 145 along the screw threads 135, the solenoid 152 and the lever 153 move with the nut member 145 and pivot about the control shaft or throttle shaft 14. While upon the movement of the nut member 145 in a pivoting direction when the forces on the wheel member 140 are in an unbalanced condition, as described hereinabove, the solenoid 152 and the lever 153 will be unaffected due to the arcuate shape of the groove 158 in the nut member 145.

The linkage mechanism 150 also comprises a lever or control member 170 which is rotatably supported on the control shaft 14 and which extends outwardly thereof into the path of movement of the solenoid 152 when it moves vertically along the screw threads 135 with the nut member 145. The lever member 170 specifically includes an end portion having spaced flange portions 171, 172 which encircle the throttle control shaft 14 and are freely rotatable thereon. The portion 173 of the lever 170 extends outwardly away from the control throttle shaft 14 and into a position in the path of movement of the solenoid 152.

The flange portion 172 of the lever 170 is operatively connected to the throttle shaft 14 by a torsion spring means 180 which is interposed between the flange portion 172 and the throttle shaft 14. The flange portion 172 of the lever 170 has an opening 182 which receives axially projecting portion 183 of the spring 180. The torsion spring 180 encircles the shaft 14 and its end opposite the end 183a is secured in an opening in the control shaft 14. It should be apparent that upon rotation of the throttle control shaft 14 by depressing the accelerator pedal of the vehicle, the control shaft 14 is rotated in a clockwise direction, as viewed in FIG. 8, and the spring 180 effects movement of the lever 170 about the throttle shaft 14 and toward the control member 145, and upon decrease in the speed of rotation thereof, the lever is likewise rotated about the shaft of the throttle control shaft 14 by the action of the spring 180.

Figures 8, 9:
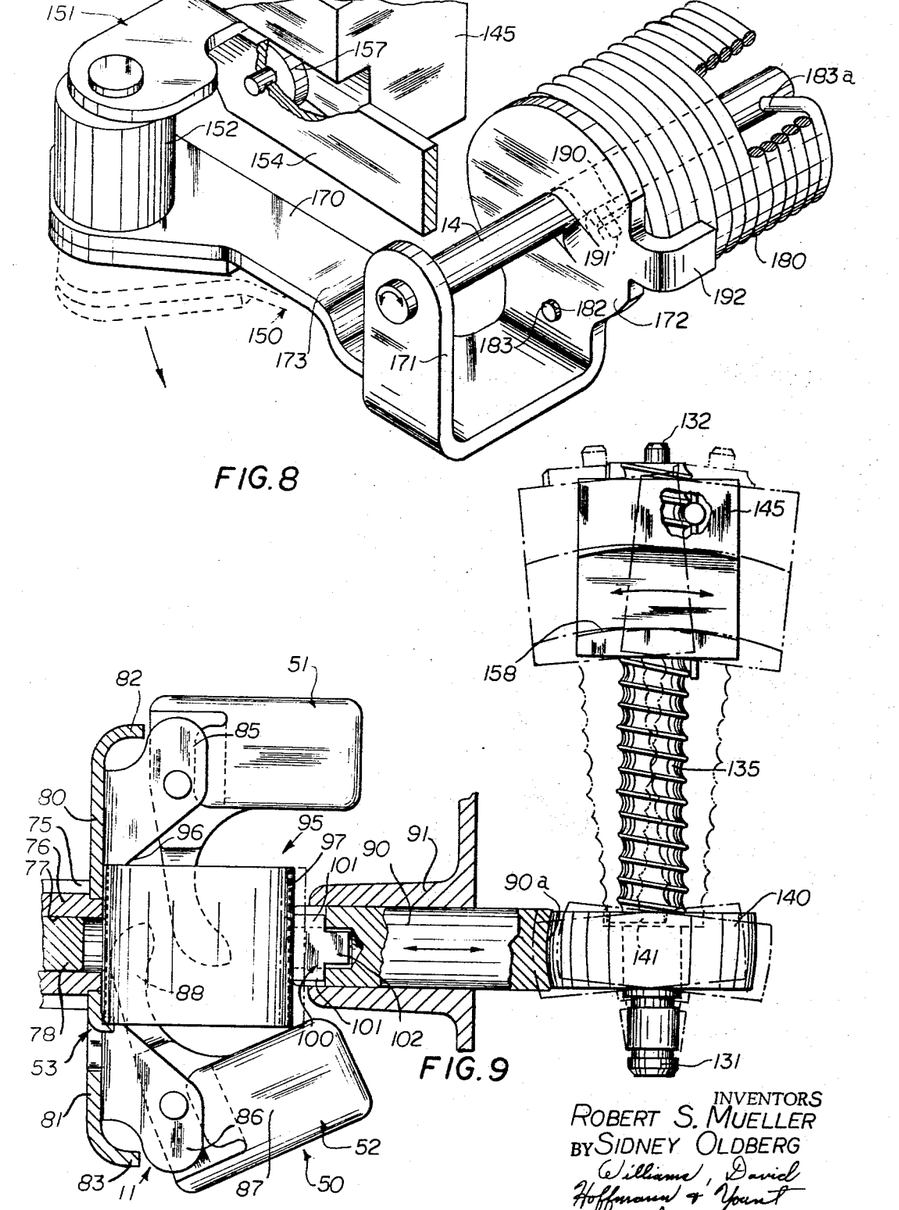
FIG. 8 is a schematic view showing a portion of the speed governor mechanism shown in FIG. 1.
FIG. 9 is a schematic view showing various operative positions of parts of the speed governor shown in FIG. 1.

The flange portion 172 of the control member 170 also includes a projecting lug member 190 which is positioned to engage a projecting portion or a pin member 191 which is connected to and extends outwardly of the throttle shaft 14 so that upon rotation of the throttle shaft in a counterclockwise direction from the position shown in FIG. 8, the pin member 191 engages the lug member 190 and effects movement of the lever 170 by such engagement away from the control member 145. The flange member 172 also includes a projection 192 which lies adjacent the outer portion of the coils of the spring 180 and functions to guide the spring on rotation thereof.

The above-described structure is operative to provide a vehicle speed control device for automatically maintaining the speed of the vehicle at a desired rate without driver control and also is operable to provide an indication to the operator when the speed of the vehicle has achieved a predetermined desired speed by providing a back pressure or a resistance to further movement of the accelerator pedal of the vehicle by the operator of the vehicle. When the vehicle is being operated by the driver to provide for operation of the governor to automatically maintain the speed of the vehicle at a predetermined desired speed, the preset mechanism 10 is actuated to compress the governor spring 21 as desired. At the same time, a suitable control button is actuated on the control shaft causing actuation of the solenoid 152.

The solenoid 152 when energized controls the position of the control or lever member 170 upon linear movement of the nut or part 145. Actuation of the solenoid 152 causes the lever 170 to be attracted to or releasably latched to the solenoid so that upon movement of the nut 145, the lever member 170, and the lever member 150 move. Compression of the governor spring causes the frame 33 to be moved to the left, as viewed in FIG. 1. This causes the pin member 90 to drive the wheel 140 as to move the nut member 145 outwardly on the screw threads 135 to its outermost position, and the lever member 170 is moved outwardly in a clockwise direction with respect to the throttle control shaft 14. As a result, the projecting portion 190 or tab on the lever 170 engages the pin 191 and causes rotation of the throttle control shaft 14 in a clockwise direction tending to increase the speed of movement of the vehicle, and tending to move the throttle control shaft to a full throttle position. When the nut member 145 reaches the end of the screw threads 135, the pin-tab one-way drive connection between the lever 170 and the throttle shaft 14 will have effected movement of the throttle shaft to a full throttle position. The vehicle will, as a result, be driven at an increasing rate of speed until the vehicle reaches the preset speed. When the vehicle has reached the preset speed, the wheel member 140, as described hereinabove, will be pivoted to a central position relative to the pin 90.

When the vehicle speed exceeds the preset speed, the wheel 140 is pivoted to the right, as viewed in FIG. 9, causing the nut member to be driven down the screw. As a result, the lever member 170 will be moved in a counterclockwise direction about the shaft 14 and the flange portion 172 of the lever 170, which portion engages the end 183 of the spring 180, effecting rotation of the spring in a counterclockwise direction and, as a result, causes rotation of the throttle control shaft 14 in a counterclockwise direction to effect a decrease in the throttle position so as to decrease the speed of the vehicle. When the vehicle speed decreases to its preset speed, the wheel 140 is centered and the preset speed is maintained. However, as the vehicle increases or decreases its speed due to changes in road resistance, road defects or slopes and grades, the control member moves along the screw threads 135 in order to effect throttle opening or closing so as to vary the speed of the vehicle as described above.

The speed governor A, as noted above, may be operative to provide an indication to the driver of the vehicle that he has reached a certain predetermined speed without the vehicle being on automatic control. In such a case, the preset mechanism 10 is actuated to compress the governor spring 21; however, the solenoid 152 is not energized. Compressing of the governor spring causes the nut member to be driven to its outward position or to a full throttle position. However, since the solenoid 152 is not energized, the lever member 170 does not move with the nut member 145 but remains in a position, such as the position shown in dot-dash lines in FIG. 8. Now as the operator depresses the accelerator pedal of the vehicle, the throttle control shaft 14 is rotated in a clockwise direction to increase the speed of the vehicle. The lever 170 is thereby rotated in a clockwise direction about the throttle control shaft through the action of the spring 180 and the interconnection between the spring and the lever 170. The lever 170 is free to move about the throttle control shaft in view of the fact tha the control member or nut member 145 is in its outward position.

When the speed of the vehicle exceeds the preset speed, the control or nut member 145 moves along the shaft downwardly from the full throttle position, in view of the fact that the wheel member 140 is tilted to the right by the operation of the biasing spring 95, as described above. The nut member 145 now moves downwardly along the screw threads 135 and engages the lever 170 and causes the lever member 170 to be moved downwardly against the action of the spring 180 tending to move it upwardly because of the force applied to the accelerator pedal by the vehicle driver. As a result, the spring 180 is tended to be rotated in a direction apposite to the throttle opening direction and a result, the spring 180 provides a resistance to further depressing of the accelerator pedal and the driver of the vehicle gets an indication that he has reached the preset speed because of the fact that the accelerator pedal becomes extremely difficult to depress any further. It should be noted, however, that the speed governor may be overrun by forcibly depressing the accelerator pedal in order to compress the torsion spring 180 to effect further acceleration of the throttle control shaft in a throttle opening direction.

The speed governor of the present invention may be operated in order to provide complete manual operation of an automative vehicle. In such a case, the governor spring is actuated to its fully compressed condition shown in dot-dash lines in FIG. 1, in which condition, the governor spring maintains the control member or nut member 145 in a throttle open position. As a result, the throttle shaft 14 may be manually operated without any resistance due to the nut member moving inwardly along the screw threads because the vehicle speed is not increased above full throttle position. Thus, by fully compressing the governor spring, the speed governor is, in effect, inoperative to provide any control to assist the driver in maintaining a predetermined vehicle speed.

The speed governor of the present invention further includes a feedback or proportional response mechanism which tends to place the wheel 140 on the center of the pin 90 at or near the preselected speed rather than having the nut 145 continually running up and down the screw threads 135. That is, the feedback mechanism limits the amount of "hunting" of the nut 145 on the screw threads 135. The feedback mechanism includes a lever portion 195 of the pivot frame 110, which lever portion projects outwardly toward the throttle control shaft 14 from one of the elongated side portions of the frame 110 and terminates in an end portion which has an opening or recess 196 therein and which is adjacent to the throttle control shaft 14. The feedback mechanism also includes a part of the solenoid supporting lever 153 and, namely, includes a tab portion 197 thereof which is positioned in the recess 196 in the lever 195.

The operation of the proportional response mechanism or feedback mechanism should be apparent. As the screw 135 pivots to the left, as shown in FIG. 1, the nut member 145 moves outwardly along the screw threads and the tab 197 moves in a counterclockwise direction about the throttle control shaft 14 and causes the feedback lever member 195 to tend to push the pivot frame 110 about its upper pivot point, tending to move the bearing support frame 33, and the pivot pin thereof, inwardly to the left. This moves the wheel 140 toward its neutral position. On the other hand, when the nut 145 moves down the screw threads 135, the solenoid lever 153 pivots in a counterclockwise direction about the throttle control shaft 14 and the tab 197 tends to pull the feedback lever 195 to the right, as viewed in FIG. 1, causing the pivot frame 33 and the pivot point for the bearing support frame 33 carrying the wheel 140 to move to the right, tending to bring the wheel 140 into a centered position relative to the pin or shaft 90. Thus, it can be seen that the feedback mechanism functions to tend to maintain the wheel 140 in a centered position relative to the pin or shaft 90.

While the preferred embodiment of the present invention has been described hereinabove in considerable detail, it is to be understood that certain modifications, adaptations, and changes herein may be made by those skilled in the art to which it relates and certain features may be used in speed governors of different structure, and it is intended hereby to cover all such changes, modifications, and adaptation falling within the scope of the appended claims.

Having described our invention, we claim:

1. In a vehicle speed control mechanism for providing an indication to the driver that the vehicle has reached a preselected speed and having a throttle control member rotatable upon actuation of the accelerator pedal of the vehicle, a control lever movable upon rotation of said throttle control member, spring means operatively connected with said throttle control member and said control lever and interposed between said throttle control member and said control lever and operable to move said control lever in a first direction when said throttle control member moves in a direction to increase the speed of the vehicle, and a member movable to engage said control lever and block further movement thereof in said first direction and to effect movement of said control lever in a second direction opposite said first direction and against said spring means when the vehicle speed exceeds the predetermined speed whereby said spring means acts against further movement of said throttle control member by actuation of said accelerator pedal.

2. In a vehicle speed control mechanism having a throttle control member rotatable in first and second directions for increasing and decreasing the vehicle speed respectively, an actuating member movable in opposite directions to effect rotation of said throttle control member in said first and second directions in response to changes in vehicle speed, means interconnecting said actuating member and said throttle control member for transmitting the movement of said actuating member to said throttle control member to effect rotation of said throttle control member upon movement of said actuating member including a torsion spring means interposed between said actuating member and said throttle control member for transmitting movement of said actuating member to said throttle control member when said actuating member moves in at least one direction and yieldable to provide for movement of said throttle control member in a speed increasing direction independent of movement of said actuating member.

3. In a vehicle speed control mechanism having a throttle control member rotatable in first and second directions for increasing and decreasing the vehicle speed respectively, an actuating member movable in opposite directions to effect rotation of the rotatable throttle control member in said first and second directions, means interconnecting said actuating member and said throttle control member for transmitting the movement of said actuating member to said throttle control member to effect rotation of said throttle control member upon movement of said actuating member including a lever member having one end thereof rotatably supported on said throttle control member and its other end operatively connected to said actuating member for movement therewith and a torsion spring means encircling said throttle control member having one end thereof connected with said lever member and the other end thereof connected to said throttle control member and operable to transmit movement of said actuating member to said throttle control member when said actuating member moves in at least one of its directions.

4. In a vehicle speed control mechanism as defined in claim 3 wherein said lever member is selectively connectable to said actuating member by a solenoid carried by said actuating member so that said lever member when so connected is moved with said actuating member, and when disconnected therefrom is movable upon rotation of said throttle control member by actuation of the accelerator pedal of the vehicle.

5. In a vehicle speed control mechanism as defined in claim 3, a positive drive connection between said lever member and said throttle control member for effecting movement of said throttle control member when said actuating member moves in a second direction opposite said one direction.

6. In a vehicle speed control mechanism as defined in claim 3, drive means for moving said actuating member including a screw member operatively associated with said actuating member so as to move said actuating member upon rotation thereof, a wheel member fixed to said screw member, and a pin member engageable with the perhipery of said wheel member and having a neutral position relative thereto in which said wheel is stationary and first and second actuated positions relative thereto in which relative positions said wheel is driven in opposite directions to drive said screw in opposite directions.

7. In a vehicle speed control mechanism as defined in claim 6, first biasing means acting against said pin biasing said pin member into engagement with said wheel and biasing said wheel in one direction, second biasing means acting against said wheel and biasing said wheel in a second direction opposite said first direction, and means supporting said wheel for pivotal movement relative to said pin in opposite directions to said first or second actuated positions depending upon the first and second biasing forces.

8. A vehicle speed control mechanism for maintaining a predetermined vehicle speed and having a throttle control member movable in first and second directions for increasing and decreasing vehicle speed, an actuating member movable in opposite directions to effect movement of said throttle control member in said first and second directions respectively, means interconnecting said actuating member and throttle control member to effect movement of the thottle control member upon movement of said actuating member, drive means for moving said actuating member in opposite directions and including a screw member operatively associated with said actuating member so as to move said actuating member upon rotation thereof, a wheel member fixed to said screw member, and a pin member engageable with the periphery of said wheel member and having a neutral position relative thereto in which said wheel is stationary and first and second actuated positions relative thereto in which relative positions said wheel is driven in opposite directions to drive said screw in opposite directions.

9. In a vehicle speed control mechanism as defined in claim 8, first biasing means acting against said pin biasing said pin member into engagement with said wheel and biasing said wheel in one direction, second biasing means acting against said wheel and biasing said wheel in a second direction opposite said first direction, and means supporting said wheel for pivotal movement relative to said pin in opposite directions to said first or second actuated positions depending upon the first and second biasing forces.

10. In a vehicle speed control mechanism as defined in claim 9, a feedback means operable to move said wheel member into its said neutral position relative to said pin in response to movement thereof from said neutral position.

11. In a vehicle speed control mechanism as defined in claim 8, a feedback means operable to move said pin and wheel members toward their said neutral relative position in response to movement thereof from said neutral position.

12. In a vehicle speed control mechanism having a throttle control member rotatable in first and second directions for increasing and decreasing the vehicle speed respectively, an actuating member operatively connected to said throttle control member and movable in opposite directions to effect rotation of said throttle control member in said first and second directions, a screw member associated with said actuating member for moving said actuating member in said opposite directions, preset means settable for selecting the predetermined speed at which the vehicle is to be driven, sensing means for sensing the vehicle speed including an input shaft driven in timed relation to the vehicle speed, and a mechanical drive connection between said input shaft and said screw member including a rotatable drive member drivingly connected with said input shaft, said drive member having a portion drivingly connected with said screw member for rotating said screw member upon rotation thereof when the vehicle speed is above or below the predetermined speed.

13. In a vehicle speed control mechanism having a throttle member rotatable in opposite directions for increasing and decreasing the vehicle speed, an actuating member operatively connected to said throttle control member and movable to effect movement thereof, drive means for moving said actuating member and operable when the vehicle speed varies from a preset speed, preset means operatively associated with said drive means and including a governor spring movable from an uncompressed position to a compressed position and overcenter spring means operable in opposition to said governor spring in each of its said positions.

14. In a vehicle speed control mechanism having a throttle control member rotatable in first and second directions for increasing and decreasing the vehicle speed respectively, an actuating member operatively connected to said throttle control member and movable in opposite directions to effect rotation of said throttle control member in said first and second directions respectively, drive means for moving said actuating member in its said first and second directions and including a screw member operatively connected with said actuating member to move said actuating member upon rotation of said screw member, a wheel member carried by said screw member and connected to said screw member to rotate said screw member upon rotation of said wheel member, a rotatable pin member engageable with the periphery of said wheel member, said wheel member being supported by a first frame means pivotally supported for movement relative to said pin member, a second frame means pivotally supporting said first frame means, biasing means acting against said first frame means and operable to effect movement thereof and movement of said wheel member relative to said pin member from a neutral position to an actuating position in which said pin member drives said wheel member.

15. In a vehicle speed control mechanism as defined in claim 14, a feedback mechanism for moving said wheel member toward said neutral positions relative to said pin member and operable in response to movement of said wheel member from said neutral position and including a lever member connected with said second frame means and operable to effect movement of said second frame means and said first frame means carried thereby in a direction to position said wheel member in its said neutral position.

16. In a vehicle speed control mechanism having a throttle control member rotatable in first and second directions for increasing and decreasing the vehicle speed respectively, an actuating member movable in opposite directions to effect rotation of said throttle control member in said first and second directions, drive means operatively connected to said actuating member to effect movement thereof when the speed of the vehicle is below or above the desired speed including a screw member operatively associated with said actuating member and rotatable in opposite directions to move said actuating member in opposite directions along the screw member, means interconnecting said actuating member and said throttle control member for transmitting the movement of said actuating member along said screw to the throttle control member to effect rotation of said throttle control member upon movement of said actuating member including a torsion spring means interposed between said actuating member and said throttle control member for transmitting movement of said actuating member to said throttle control member when said actuating member moves in at least one of its directions.

17. In a vehicle speed control mechanism having a throttle control member movable in first and second directions for increasing and decreasing the vehicle speed respectively, an actuating member movable in opposite directions to effect movement of said throttle control member in said first and second directions respectively, means interconnecting said actuating member and throttle control member to effect movement of the throttle control member upon movement of said actuating member, and drive means for moving said actuating member in opposite directions and including a screw member operatively associated with said actuating member so as to move said actuating member upon rotation thereof, a driving member connected with said screw member and operable to rotate said screw member upon movement thereof and a drive member operatively associated with said driving member and having a neutral position relative thereto wherein said drive member is eneffective to move said driving member and actuated positions on opposite sides of said neutral position wherein said drive member is operable to drive said driving member in opposite directions.

18. In a vehicle speed control mechanism having a throttle control member movable in first and second directions for increasing and decreasing the vehicle speed respectively, an actuating member movable in opposite directions to effect movement of said throttle control member in said first and second directions respectively, means interconnecting said actuating member and throttle control member to effect movement of the throttle control member upon movement of said actuating member, drive means for moving said actuating member in opposite directions and including a screw member operatively associated with said actuating member so as to move said actuating member upon rotation thereof, a driving member connected with said screw member and operable to rotate said screw member upon movement thereof and a drive member operatively associated with said driving member and having a neutral position relative thereto wherein said drive member is ineffective to move said driving member and actuated positions on opposite sides of said neutral position wherein said drive member is operable to drive said driving member, and a feedback mechanism operable in response to relative movement of said drive and driving members from said neutral position to move said members toward said neutral position.

19. A control mechanism for use in moving an actuating member to control the position of the throttle of a vehicle to maintain the vehicle at a predetermined speed comprising, a control member movable upon a variance in vehicle speed from said predetermined speed and operable upon movement to control movement of said actuating member, means for effecting movement of said control member including electromagnetic means having a coil, a part movable linearly and operatively associated with said coil, said electromagnetic means being supported adjacent to said control member and operable when energized to control the position of said control member through movement of said part, and means for moving said part linearly in response to a variance in vehicle speed from said predetermined speed including weight means rotatable in response to vehicle speed and having a portion movable in response to changes in vehicle speed, and said portion being mechanically interconnected to said part to effect linear movement of said part upon movement of said portion in at least one direction.

20. A control mechanism for use in moving an actuating member to control the position of the throttle of a vehicle to maintain the vehicle at a predetermined speed, comprising a control member movable upon a variance in vehicle speed from said predetermined speed and operable upon movement to control movement of said actuating member, means for effecting movement of said control member including, electromagnetic means having a coil, a part movable linearly and operatively associated with said coil, said electromagnetic means being supported adjacent to said control member and operable when energized to releasably lock the control member to said part to control the position of said control member through movement of said part, and means for moving said part linearly in response to a variance in vehicle speed from said predetermined speed including, weight means rotatable in response to vehicle speed and having a portion movable in response to changes in vehicle speed, and said portion being mechanically interconnected to said part to effect linear movement of said part upon movement of said portion in at least one direction.

21. An apparatus comprising a member movable in one direction upon an increase in the speed of the vehicle and operable upon movement to move a throttle control member in a direction to increase the speed of the vehicle, means for applying a force in opposition to movement of said movable member in said one direction when said vehicle reaches a predetermined speed including a lever member operatively connected with said movable member and movable in a direction to oppose movement of said movable member in said one direction at said predetermined speed, and means for moving said lever member in said opposing direction including a part movable to a predetermined position to effect movement of said lever member, weight means rotatable in response to vehicle speed and having a portion movable in response to changes in vehicle speed, and a mechanical drive connection interconnecting said portion and said part and effecting movement of the part upon movement thereof.

22. In a vehicle speed control mechanism having a throttle control member rotatable in first and second directions for increasing and decreasing the vehicle speed respectively, an actuating member operatively connected to said throttle control member and movable in opposite directions to effect rotation of said throttle control member in said first and second directions, a screw member associated with said actuating member for moving said actuating member in said opposite directions, preset means settable for selecting the predetermined speed at which the vehicle is to be driven, sensing means for sensing the vehicle speed including an input shaft driven in timed relation to the vehicle speed, a drive member operatively connected with said input shaft and said screw member for driving said screw member when the vehicle speed is above or below the predetermined speed, said sensing means including a rotatable weight carriage and weight means carried by the carriage and movable upon rotation thereof, and a hollow spring member connected with said weight carriage and said rotatble member for transmitting torque therebetween and biasing said rotatable member outwardly of said carriage.

23. In a vehicle speed control mechanism as defined in claim 22, wherein said spring member includes a projecting tab portion received in a slot in said rotatable member.

24. In a vehicle speed control mechanism as defined in claim 22, wherein said weight means include actuating portions extending into the interior of said hollow spring member and engaging a portion of said spring member and urging said spring member outwardly of said carriage with an increasing force.

25. In a vehicle speed control mechanism is defined in claim 22 wherein said input shaft is operatively connected to a one-way drive for operating said sensing means only when the vehicle is moving in a forward direction and including a flexible finger connected to said input shaft and engageable with a cam on a drive member to drive the drive member in one direction and biased out of a driving relationship with the drive member when rotated in the reverse direction.

26. In a vehicle speed control mechanism as defined in claim 22 wherein said present means includes a governor spring and a lever member associated with said governor spring and movable to compress said governor spring and spring means operatively associated with said governor spring and lever member to oppose the action of said governor spring when so compressed and balance the governor spring load.

27. In a vehicle speed control mechanism having a throttle control member rotatable in opposite directions for increasing and decreasing the vehicle speed, an actuating member operatively connected to said throttle control member and movable to effect movement thereof, drive means for moving said actuating member and operable when the vehicle speed varies from a preset speed, preset means operatively associated with said drive means and including a governor spring movable from an uncompressed position to a compressed position and over-center spring means operable in opposition to said governor spring in each of its said positions, said governor spring bearing against a first frame member pivotally supported for movement in first and second directions, a second frame member pivotally supporting said first frame member, said first frame member carrying a screw member operatively associated with said actuating member to move said actuating member upon rotation of said screw member.

28. In a vehicle speed control mechanism as defined in claim 27 wherein a wheel member is carried by said screw member and a rotatable pin member engages the wheel member, said wheel member having a neutral position relative to said pin member and actuating positions relative to said pin member to which it is pivoted upon pivotal movement of said first frame member.

References Cited

UNITED STATES PATENTS

| | | | |
|---|---|---|---|
| 2,973,051 | 2/1961 | Teetor. | |
| 3,090,460 | 5/1963 | Teetor | 180—82.1 |
| 3,118,308 | 1/1964 | Hebb | 73—530 |
| 3,202,161 | 8/1965 | Richards | 123—103 |
| 3,217,827 | 11/1965 | Pickles | 180—82.1 |

KENNETH H. BETTS, *Primary Examiner.*